W. H. HOYLE & T. BARKER.
ELONGATING OR DRAFTING MACHINE FOR PRODUCTION OF RECONDENSED YARN.
APPLICATION FILED JULY 11, 1908.
984,922.
Patented Feb. 21, 1911.
4 SHEETS—SHEET 2.
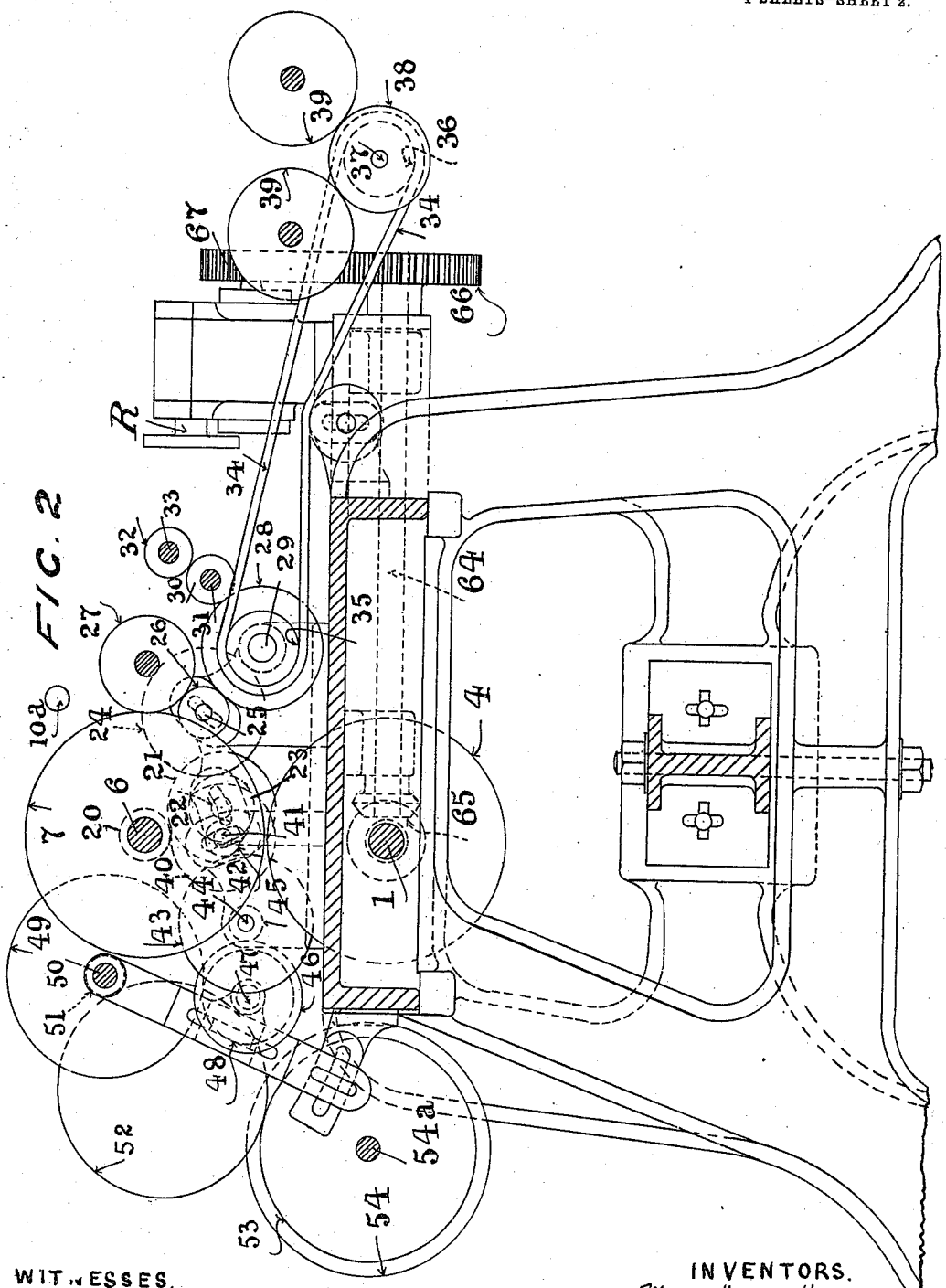

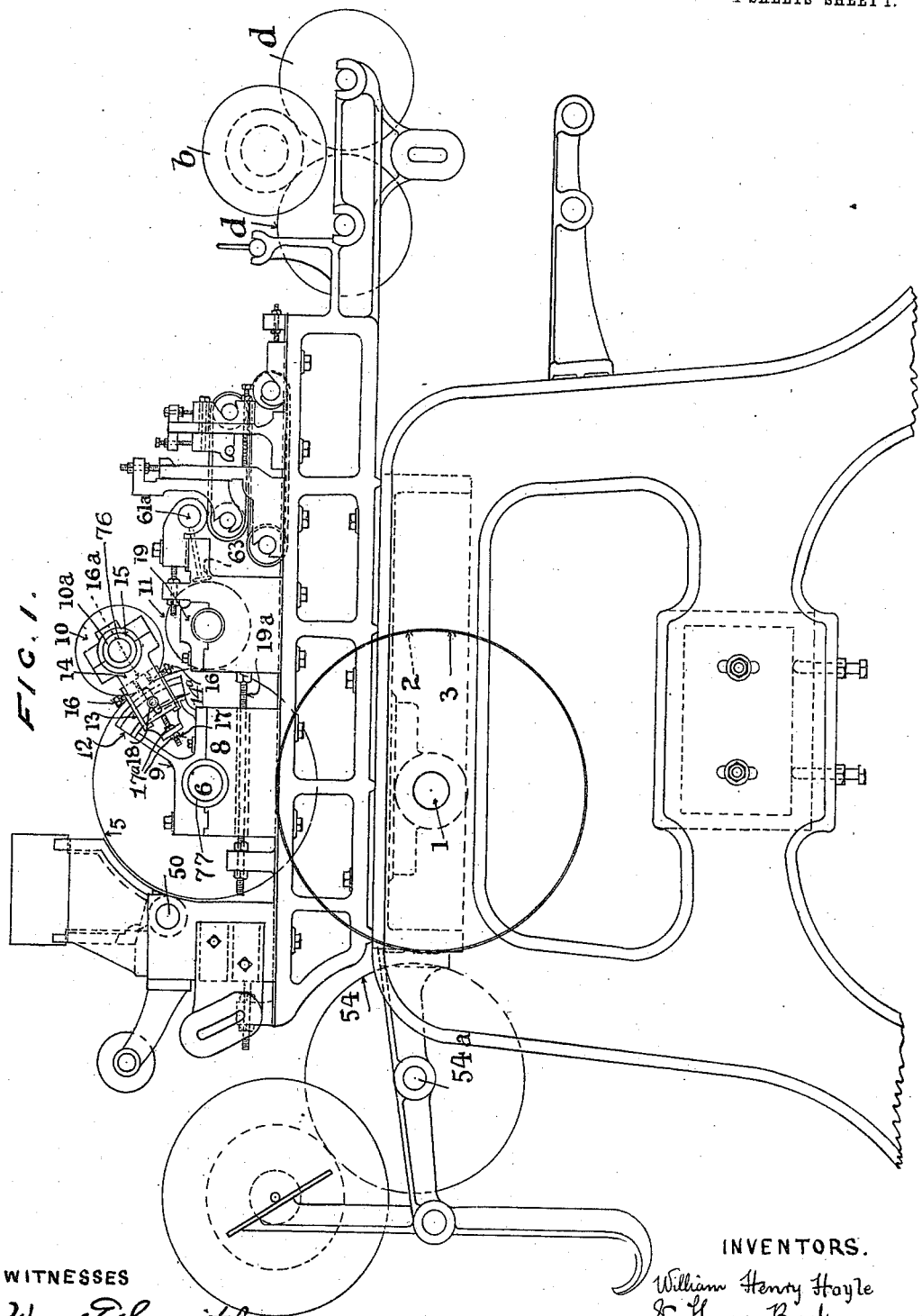

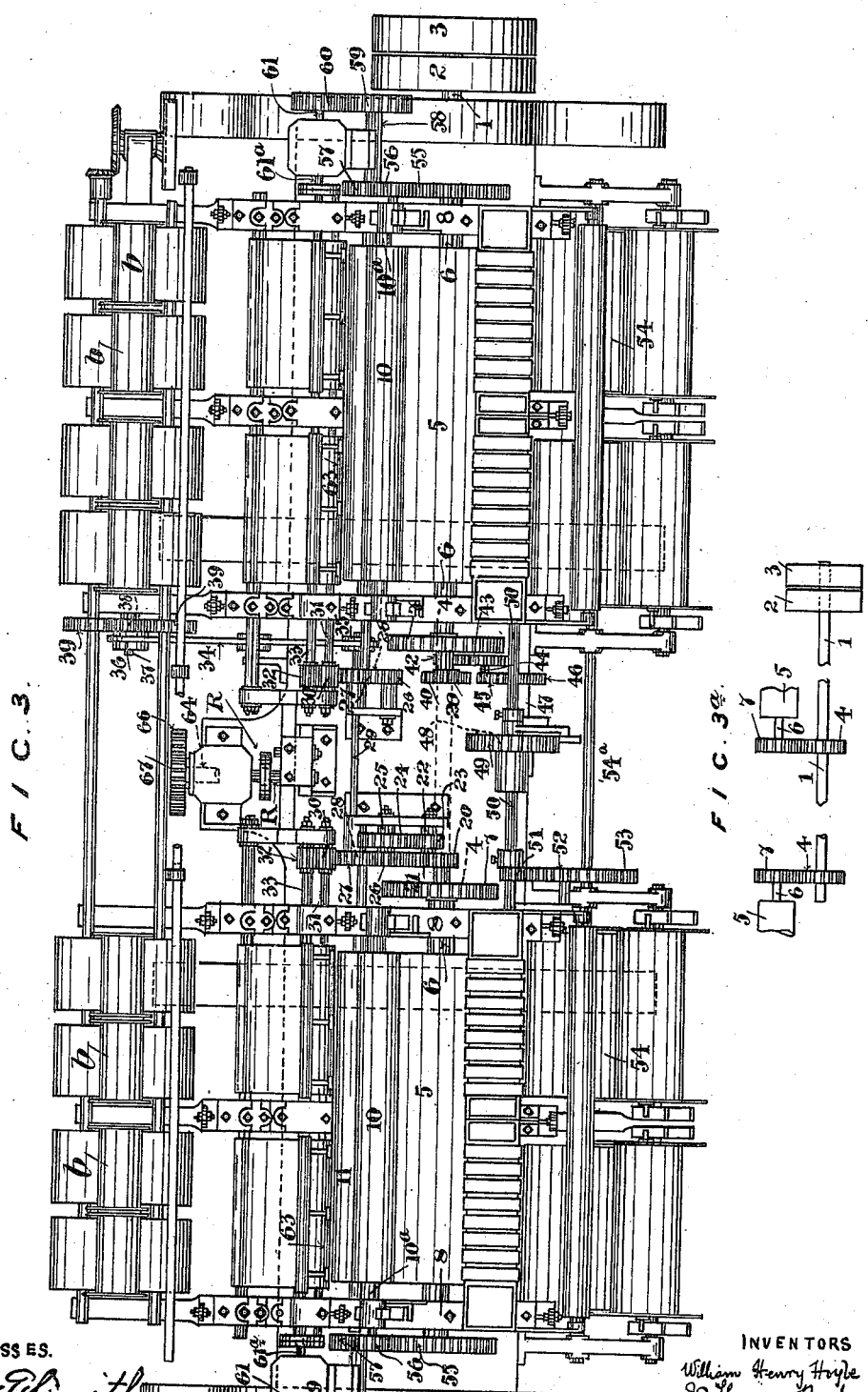

W. H. HOYLE & T. BARKER.
ELONGATING OR DRAFTING MACHINE FOR PRODUCTION OF RECONDENSED YARN.
APPLICATION FILED JULY 11, 1908.
984,922.
Patented Feb. 21, 1911.
4 SHEETS—SHEET 4.
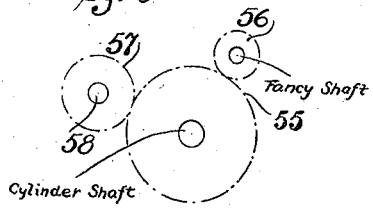
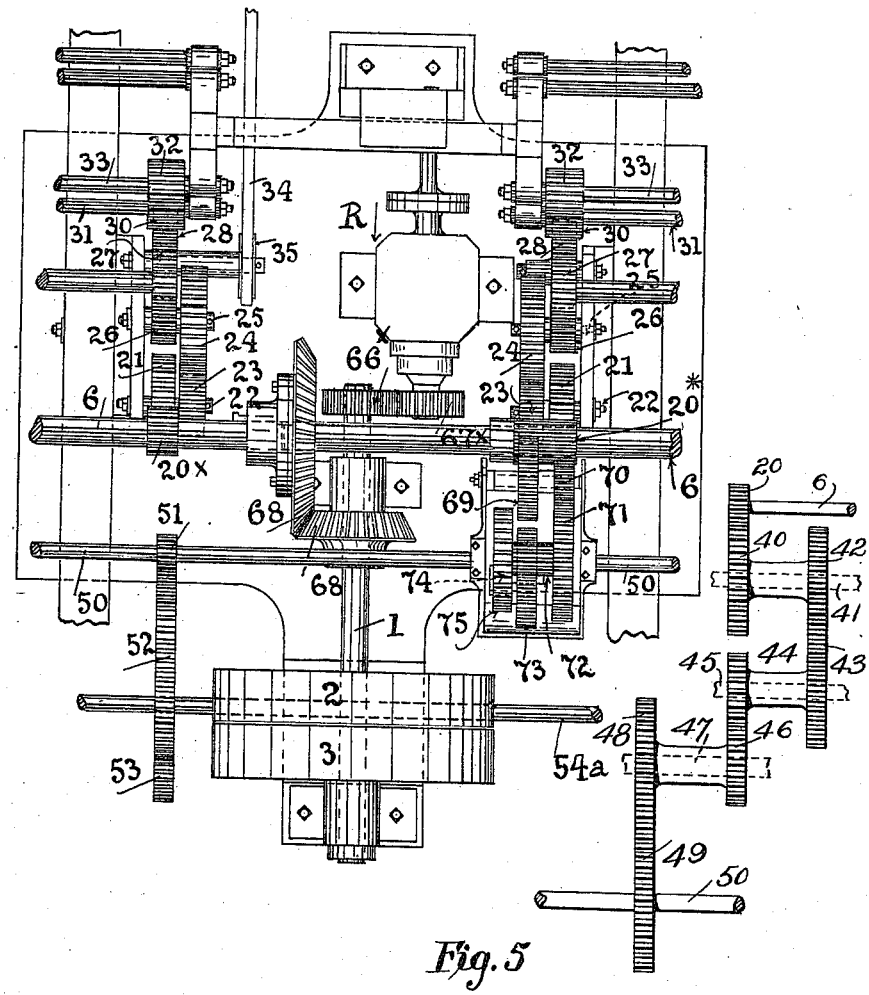
WITNESSES
INVENTORS
William Henry Hoyle
& Thomas Barker
By their Attorney

UNITED STATES PATENT OFFICE.

WILLIAM HENRY HOYLE AND THOMAS BARKER, OF BOLTON, ENGLAND.

ELONGATING OR DRAFTING MACHINE FOR PRODUCTION OF RECONDENSED YARN.

984,922. Specification of Letters Patent. Patented Feb. 21, 1911.

Application filed July 11, 1908. Serial No. 443,140.

*To all whom it may concern:*

Be it known that we, WILLIAM HENRY HOYLE, cotton-spinner, and THOMAS BARKER, consulting engineer, subjects of the King of Great Britain and Ireland, residing, respectively, at 86 Chorley New Road, Bolton, in the county of Lancaster, England, and 352 Church road, Smithills, Bolton, aforesaid, have invented new and useful improvements in elongating or drafting and such like machines for the production of recondensed yarn or yarn of comparatively fine counts having the characteristics of condenser yarn, of which the following is a specification.

Our said invention relates to elongating or drafting and in some cases combined elongating or drafting and spinning machines of a more or less new class invented by us for the production of re-condensed yarn and which machines or parts thereof form the subject matter of United States Patents Nos. 708046 and 739877.

This present invention particularly concerns the arrangement of and the driving of the rotating or the moving parts of such machines.

We seek to so drive the machine that we shall be able to quickly remove the "fancy", the cylinder, and the doffer, when required, without any considerable dismantling, and to readily replace the same. Heretofore the removal (for grinding or other reason) and replacing of such wire clothed parts has been a difficult matter and one which has consumed much time. Further than this, we seek to have, as far as conveniently possible, a positive drive in respect to each moving part, for whereas we used gear wheels for communicating motion to certain parts, certain other important parts of the machine have heretofore been driven by straps or bands and such bands involved the use of carrier-pulleys and tightening devices which called for constant attention. For example the main cylinder has been driven by a strap or band, also the "fancy" as well as the doffing-comb and the rubbers. We find with continued experience that more certain control as to uniformity in the speed of revolution or movement of such parts is desirable, and particularly with relation to the cylinder drive, the "fancy" drive, the driving of the doffing comb, and of the "rubbers" to reciprocate same.

If the band slips in driving the cylinder (in cases where the yarn is spun straightaway) the twist is increased. Then with regard to the "fancy" it is necessary that the same should have a surface gain and one which can be uniformly preserved if it be desired to prevent a certain unevenness in the yarn. The doffer comb too should always start with certainty or ends may be broken down, while with any slip occurring in the rubbers the yarn may not be sufficiently or uniformly rubbed, which causes some difficulty in unwinding from the bobbins in case the material is spun or dealt with on an independent machine.

We aim at obtaining a drive which will both allow of rapid and easy removal of the required parts and provide for the positive actuation of the moving elements (or certain of them) with intent of obtaining and preserving a constant speed of movement, thereby giving greater uniformity, dispensing with certain parts, and overcoming difficulties. The way in which such parts are mounted and positively driven may vary considerably while still being within the scope of our invention, having mentioned which, we now proceed to describe the best systems at present known to us and by which the object of our invention can be accomplished and the machine improved.

The attached drawings illustrate the machine and the improvements made in connection therewith according to our present invention.

In the said drawings: Figure 1 shows a side elevation of the new elongating frame or machine in its remodeled form, the main cylinder, the "fancy," and the doffer being clearly indicated. Fig. 2 is a transverse section of the machine or frame and shows a considerable portion of the driving gear. Fig. 3 is a plan view of the complete frame or machine for a limited number of ends, provision for a small number only being illustrated in the drawn plan, owing to the limited space in the sheet, the figure requiring considerable space longitudinally. Fig. 3ª is a detail view showing how the main cylinders are driven from the main or first motion shaft, the figure being drawn to a reduced scale. Fig. 4 shows a modification in the way of driving the cylinder shaft, the rubber reciprocating mechanism, and the feed rollers, which modification will be fully dealt with later on in the specification. Fig. 5 is a detail diagrammatic view showing the gear connection between the shaft 6 of the main cylinder and the shaft 50 of the feed roller, the relative sizes of the gears being changed from those shown in Fig. 2 for the sake of clearness. Fig. 6 is an end view showing the cylinder and fancy shafts with their gear wheels.

In the construction of elongating frame or machine now being described to the reader, and for the purposes of the new drive in accordance with our invention, we use a main shaft 1 which is suitably journaled and has fast and loose pulleys 2, 3, the same being actuated from a line shaft or otherwise. This main shaft 1 carries two spur wheels (where two main cylinders in line with each other are used as the drawing shows) and these two spur wheels are lettered 4, 4. Immediately above such shaft 1 and spur wheels 4, 4 the main cylinders 5, 5 are located, the same being mounted on shafts 6, 6 and driven by spur wheels 7, 7 which gear with the spur wheels 4, 4 on the main shaft 1. The diagram Fig. 3$^a$ makes this sufficiently clear. Each cylinder shaft 6 fits in bearings which have an adjustable or other base block 8 and a cover or pedestal cap 9, as very clearly shown in Fig. 1, whereby, on the removal of the caps 9 9 the particular cylinder 5 can be lifted away without any serious difficulty being encountered and without any considerable dismantling. Facility in removing the "fancy" 10 and the doffer 11 are, as explained, points in our invention, and in the drawings the covers or caps 9, 9 are formed with fixed bends 12 which support angularly adjustable brackets 13 in which arms 14 are guided and in which arms each "fancy" shaft is journaled at 15. The screwed pinching studs 16, 16, serve to regulate angular adjustment of the bracket 13 by bearing on the projection 16$^a$ on the fixed bend 12 and the screw 17 serves to set up the arm 14, the same passing through the web of the bracket 13 and being held by lock nuts 17$^a$. A headed bolt with nuts, such bolt being lettered 18 serves to clamp the arm 14 and the bracket 13 to the bend 12 after adjustment has been made. The arm 14 has a long slot 14$^a$ to allow of adjustment of the arm 14.

76 and 77 denote bushes for the fancy shaft and the main cylinder shaft respectively. The bush 76 fits the bearing 15 and the bush 77 fits the pedestal 8 and both are gripped fast and form the bearing proper. The "fancy" rollers 10 may be lifted away with the caps and fixed bend complete, or the caps of the journals for the fancy rollers may be removed and the "fancy" lifted away alone. The system of carrying the "fancy" rollers 10 allows for ready setting up or adjustment of the clothed surfaces and also of radial movement of each "fancy" with respect to the cylinder. The doffer 11 can also be removed after the "fancy", by taking off the pedestal caps 19. Adjusting spindles 19$^a$ passing through the bearing blocks 8 serve to adjust the doffer bearing blocks horizontally. The usual holding bolts serve to secure the various bearing blocks to the framing. Under our invention no gear wheels exist or framing above these revolving parts to interfere with the lifting away of the before described cylinders and rollers from their bearings.

We have so far described how the main cylinders are driven and the way in which the main cylinders, the fancy rollers, and the doffers can be removed. We now return to the gearing. The left-hand cylinder shaft 6 carries a small spur wheel 20 which gears into the wheel 21 of a compound spur wheel running on a stud carrier 22 the other spur wheel 23 gearing with a spur wheel 24 of a compound spur wheel on a stud carrier 25 or elsewhere the other spur wheel 26 of this second compound spur gearing into a spur wheel 27 fixed on the doffer shaft this other spur wheel 26 also driving a spur wheel 28 fixed on a cross shaft 29. The spur wheel 28 on the cross shaft 29 drives a spur wheel 30 on the lower rubber shaft 31 which spur wheel 30 gears with a spur wheel 32 on the upper rubber shaft 33. This combination leaves room for easy access to the upper rubber supports as the plan view Fig. 3 shows.

To drive the batching means or devices which take up the delivered ends we use a chain 34 which extends from a chain wheel 35 on the cross shaft 29 to a chain wheel 36 on the shaft 37 a pinion 38 on such shaft driving pinions 39 to rotate the drums $d$ or the like upon which the batching drums or bobbins $b$ rest. The gears 26, 27, 28, 30 and 32 are repeated on the right-hand side and the motion therefor is derived from the cross-shaft 29.

For the purpose of actuating the feed rollers we take motion by spur wheels from the right hand pinion 20 which gears into the spur wheel 40 of a compound spur wheel on the stud 41 the other spur wheel whereof 42 gears with a spur wheel 43 on the axis 44 of which is a small spur wheel 45 which drives the spur wheel 46 on the axis 47 whereon is also the spur wheel 48 which drives the spur wheel 49 and thereby the feed roller shaft 50 is driven. The feed lap drum or drums are driven by convenient gearing, for instance, the feed roller shaft 50 may have a gear wheel 51 gearing into the spur wheel 52 which drives the spur wheel 53 on the axle 54$^a$ of the feed lap drum 54. This way of driving the feed lap drum or drums may vary.

With the object of driving the "fancy" 10, and also the doffing comb 63, a spur wheel 55 which is mounted on the cylinder shaft 6 is or may be used, the spur wheel 55 driving another spur wheel 56 meshing therewith and attached on the shaft of each "fancy" whereby each fancy is driven direct from a spur wheel on the main cylinder shaft. The spur wheels 55 on each main cylinder shaft each gear into a carrier spur wheel 57 on a stud or shaft 58 suitably supported in bearings and upon each of said shafts is a second spur wheel 59 which drives a spur wheel 60 fixed on the comb motion shaft 61 which gives movement to the parts which oscillate the comb shaft 61ª and comb 63. It is obvious that this group of gearing would exist at each end there being two comb shafts to drive, as the plan view Fig. 3 indicates.

The "fancy" shaft 10ª is at a somewhat higher level than the cylinder shaft and such shaft is well and firmly supported in bearings as indicated and can be readily and quickly removed as already explained.

The way of driving the doffer rollers indicated is advantageous because as they or their spur wheels under this present arrangement no longer drive any moving part (see Fig. 2) the doffer is not deflected by strain as was liable to occur before, and consequently closer and more accurate setting can be effected.

To drive the reciprocating mechanism for the rubbers we may use a horizontal shaft 64 mounted in bearings and driven by bevel gear 65 from the main shaft 1 such horizontal shaft 64 being provided with a spur pinion 66 which gears with a spur wheel 67 in connection with or forming part of the rubbing device R. The means for reciprocating the rubbers is illustrated in the before mentioned Patent 739,877.

By our invention we at once simplify the driving, make same positive and determinable, and we dispense with all guide pulleys and tightening arrangements, and get a better and more uniform product. In addition to this, the indicated arrangement is such that we can with the greatest ease remove or replace the cylinders, "fancy" rollers and doffers, which is a point of the utmost importance, this being a job not easy of accomplishment under our earlier construction. Any required or desirable variation in the gearing, or its disposition, we may make having regard to the object of our invention as set forth.

Fig. 4 is a plan view and shows a modified arrangement of driving so far as the disposition of the fast and loose pulleys are concerned and the manner of driving the main cylinder shaft. Also the way of actuating the means which reciprocate the rubbers and of driving the feed rollers is slightly different. In this modification the fast and loose pulleys 2, 3 are at the back of the machine and the cylinder shaft is driven by bevel gears 68 from the main short shaft 1. This short shaft 1 drives the means which reciprocate the rubber by spur wheels 66ˣ and 67ˣ. The spur wheel on the left-hand side 20ˣ, is the equivalent of 20 mentioned before and drives through 21, &c., up to 32. In this case the chain wheel 35 is rotated by 28 and communicates motion by chain 34 to operate the take-up or batching means. Practically the same train of gear exists on the right-hand side and can be followed by the lettered parts which receive initial motion from the long spur wheel 20* on the cylinder shaft 6. To drive the feed roller shaft 50 the before mentioned spur wheel 20* on the cylinder shaft 6 actuates a spur wheel 69 compounded with a spur wheel 70 which drives a spur wheel 71 compounded with 72. The wheel 72 gears into 73 which is below and is compounded with 74 which in turn drives a spur wheel 75 fixed on the feed roller shaft 50 and thus the rotation of the feed roller shaft is brought about. The axle 54ª gets motion from 50 through gear wheels 51, 52 and 53 as before related. In the machine illustrated in the drawings, the product is removed on the bobbins, and the ends are intended to be fed into a spinning machine for spinning and twisting as will be understood.

We declare that what we claim is.

1. An elongating machine comprising a main cylinder, a fancy, and a doffer, intermeshing gear wheels for driving said parts, rubbing mechanism and gear wheels for driving said rubbing mechanism from one of the before-mentioned gear wheels, the gear wheel on the doffer being operated independently of the gear wheel on the rubbing mechanism.

2. In machines of the indicated kind a main cylinder, brackets supporting same, caps for bearing halves, fixed bends in connection with such caps, angularly movable brackets supported by said fixed bends, radially adjustable arms on said movable brackets, bearings in said adjustable arms, a fancy supported thereby, a doffer, brackets for supporting said doffer, removable caps on said brackets and means for adjusting said doffer brackets as and for the purposes herein described.

3. A machine of the class described, comprising a main cylinder, removable bearings therefor, a main shaft, means for positively driving the cylinder from said shaft, a fancy, removable bearings for said fancy, means for positively driving the fancy from the main shaft, a doffer, removable bearings therefor, a gear wheel on the doffer, rubbing mechanism, a gear wheel on said mechanism operated independently of the doffer gear, a gear wheel actuating said gear wheels, and means for positively connecting said actuating gear wheel with the main cylinder shaft.

4. A machine of the class described, comprising a main cylinder, means for removably supporting the same, a main shaft, a fancy, means for adjusting the position of the fancy in relation to the main cylinder, means for removably supporting the fancy, a doffer, means for adjusting the position of the doffer in relation to the main cylinder, means for removably supporting the doffer, a gear wheel on the doffer, gear wheels connecting the fancy and the gear wheel on the doffer with the main shaft, rubbing mechanism and a gear wheel connecting the same with one of said connecting gear wheels.

In testimony whereof we have signed our names to this specification in the presence of two subscribing witnesses.

WILLIAM HENRY HOYLE.
THOMAS BARKER.

Witnesses:
  JOSHUA ENTWISLE,
  ALFRED YATES.